United States Patent
Bronk (10) Patent No.: US 9,642,006 B2
(45) Date of Patent: May 2, 2017

(54) SECURE WIRELESS CHARGING

(71) Applicant: Intel Corporation, Santa Clara, CA (US)

(72) Inventor: Mateusz Bronk, Gdansk (PL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/441,547

(22) PCT Filed: Jul. 24, 2014

(86) PCT No.: PCT/PL2014/050044
§ 371 (c)(1),
(2) Date: May 8, 2015

(87) PCT Pub. No.: WO2016/013944
PCT Pub. Date: Jan. 28, 2016

(65) Prior Publication Data
US 2016/0050563 A1    Feb. 18, 2016

(51) Int. Cl.
*G06F 7/04* (2006.01)
*H04W 12/06* (2009.01)
(Continued)

(52) U.S. Cl.
CPC .......... *H04W 12/06* (2013.01); *G06F 21/33* (2013.01); *G06F 21/44* (2013.01); *G06F 21/81* (2013.01);
(Continued)

(58) Field of Classification Search
None
See application file for complete search history.

(56) References Cited

U.S. PATENT DOCUMENTS

2012/0326524 A1    12/2012   Matsumoto et al.
2013/0257364 A1*   10/2013   Redding ............... H02J 5/005
                                                        320/108
2014/0195803 A1    7/2014    Knubben

FOREIGN PATENT DOCUMENTS

TW        200631211        9/2006

OTHER PUBLICATIONS

International Searching Authority, "Notification of Transmittal of the International Search Report and the Written Opinion of the International Searching Authority," mailed Apr. 1, 2015, in International application No. PCT/PL2014/050044.

(Continued)

*Primary Examiner* — Brandon Hoffman
(74) *Attorney, Agent, or Firm* — Trop, Pruner & Hu, P.C.

(57) ABSTRACT

An embodiment includes a method executed by at least one processor of a member computing node comprising: establishing a communication channel with a verifier computing node, the member computing node and the verifier computing node each coupled to a respective charging coil; determining a group of devices approved for charging with the verifier computing node; determining the member computing node is a member of the group of devices; authenticating the member computing node to the verifier computing node; in response to authenticating the member computing node to the verifier computing node, inductively charging the member computing node based on a magnetic field produced by the verifier computing node. Other embodiments are described herein.

25 Claims, 5 Drawing Sheets

(51) Int. Cl.
- *G06F 21/33* (2013.01)
- *G06F 21/44* (2013.01)
- *G06F 21/81* (2013.01)
- *H02J 7/02* (2016.01)
- *H04L 29/06* (2006.01)
- *H04M 19/08* (2006.01)
- *H02J 50/10* (2016.01)
- *H02J 7/00* (2006.01)

(52) U.S. Cl.
CPC .............. *H02J 7/025* (2013.01); *H02J 50/10* (2016.02); *H04L 63/062* (2013.01); *H04L 63/0823* (2013.01); *H04L 63/0876* (2013.01); *H04M 19/08* (2013.01); *H02J 2007/0001* (2013.01)

(56) References Cited

OTHER PUBLICATIONS

Brickell, Ernie, et. al., "Enhanced Privacy ID: A Direct Anonymous Attestation Scheme with Enhanced Revocation Capabilities," IEEE Transactions on Dependable and Secure Computing, IEEE Service Center, New York, NY, vol. 9, No. 3, May 1, 2012, pp. 345-360.

Cisco Systems, "Internet Key Exchange Protocol," Training Module, Cisco Systems, Inc., 2001, 25 pages.

Walker, Jesse, et. al., "Key Exchange with Anonymous Authentication using DAA-SIGMA Protocol," Intel Labs, 19 pages, 2010.

Giani, Annarita, "Identification with Zero Knowledge Protocols," Security Essentials, Version 1.2e, SANS Institute InfoSec Reading Room, 2001, 9 pages.

Brickell, Ernie, et. al., "Enhanced Privacy ID: A Remote Anonymous Attestation Scheme for Hardware Devices," Intel Technology Journal, vol. 13, Issue 2, 2009, 16 pages.

Intel Corporation, "Deeper Levels of Security with Intel Identity Protection Technology," White Paper, Intel Identity Protection Technology, 2011, 8 pages.

Wikipedia, "Near field communication," http://en.wikipedia.org/wiki/Near_field_communication, accessed Apr. 24, 2014, 14 pages.

Wireless Power Consortium, "System Description, Wireless Power Transfer," Version 1.1.2, Jun. 2013, 116 pages.

Taiwan Intellectual Property Office, Office Action mailed May 4, 2016 in Taiwan Patent Application No. 104118789.

Taiwan Intellectual Property Office, First Office Action mailed Aug. 15, 2016, in Taiwanese Patent Application No. 104118789.

* cited by examiner

405 establish a communication channel with a member computing node, the member computing node and the verifier computing node each coupled to a respective charging coil 410 communicate a group of devices approved for charging between the verifier and member computing nodes 415 authenticate the member computing node to the verifier computing node 420 in response to authenticating the member computing node to the verifier computing node, inductively charge the member computing node based on a magnetic field produced by the verifier computing node

SECURE WIRELESS CHARGING

TECHNICAL FIELD

An embodiment addresses secure wireless charging and, more specifically, device authentication and policy enforcement in wireless charging applications.

BACKGROUND

Mobile computing nodes (e.g., Smartphones, tablets, notebooks, laptops, Ultrabooks®, automobiles, aviation drones, fitness bands worn on the wrist/body to monitor biological data, spectacles that provide internet access, combinations thereof such as a hybrid tablet and Smartphone, and the like) have challenging power requirements due to, for example, their need for small batteries to be truly mobile and the tendency for users of mobile computing nodes to leave the devices on for long periods of time. As a result, wireless charging solutions for mobile computing nodes may become more and more useful to users. Charging solutions such as wireless charging stations may be located in places such as airports, restaurants, coffee shops, community centers, offices, schools, libraries, buses, trains, planes, automobiles, parks, bus stops, and the like. These wireless charging stations (sometimes referred to herein as a power transmitter, transmitter node, or base station) use a primary coil to cooperate with a secondary coil of a receiver node (sometimes referred to herein as a power receiver or receiver node) to conduct wireless inductive charging of the receiver node (which may be a mobile computing node such as a Smartphone). Standards for inductive power delivery include, for example, those promoted by Qi Wireless Charging (developed by the Wireless Power Consortium), WiTricity Corporation, and the like.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

An embodiment addresses the problem of authorizing receiver nodes (e.g., mobile computing nodes) to power transmitter nodes (e.g., charging stations) so only allowed receivers nodes may drain power from transmitter nodes. The embodiment allows fine-grained control over whether a certain receiver node is allowed to charge from a certain transmitter node. The ability for a mobile computing node (receiver node), such as a Smartphone or battery operated vehicle (e.g., aviation drone or automobile), to be able to interface with a large number of charging stations adds a differentiation point for such a receiver node (and its related vendor or manufacturer) over mobile computing nodes that do not have such capabilities. Further, this authorization scheme allows for a pay-per-use scenario for the venues offering the wireless charging stations.

An embodiment (but not all embodiments) uses an Enhanced Privacy ID (EPID) digital signature scheme to authorize the receiver node to the transmitter node.

Regarding EPID, the scheme can be viewed as a special digital signature scheme where one public key in the EPID scheme corresponds to multiple private keys. There are three types of entities in an EPID scheme: issuer, member, and verifier. The issuer may be a hardware manufacturer, the member may be a hardware device made by the manufacturer, and the verifier may be software on a host node, a server on the internet, or another hardware device. The issuer creates an EPID public key that corresponds to a unique EPID private key that each member has. Each member can use its private key to digitally sign a message and the resulting signature is called an EPID signature. The verifier can use the public key to verify the correctness of the signature, that is, to verify that the EPID signature was indeed created by a member in good standing with a valid private key. The EPID signature, however, does not reveal any information about which unique private key was used to create the signature.

An embodiment provides a communication channel (e.g., bi-directional channel) between the transmitter and receiver nodes. The communication channel may be built-in to the wireless charging protocol (e.g., Qi "System Description Wireless Power Transfer Volume I: Low Power Part 1: Interface Definition, Version 1.1.2, June 2013", referred to herein as the "Qi protocol"), or out-of-band and thereby unrelated to the charging protocol. The system may only require network (Internet) access capability for the receiver node and not for the transmitter node. By using EPID, the transmitter node does not necessarily need a direct uplink to the network and may only need to verify if a receiver node belongs to a pre-programmed EPID group that is already approved for wireless charging with the transmitter node. Policy implementation and enforcement may be also implemented in some embodiments using vendor-controlled Online Certificate Status Protocol (OCSP) responders, depending on usage applications and privacy requirements. While various embodiments discussed herein address EPID, other embodiments are not limited to EPID and may use other authorization schemes (addressed below).

Thus, an embodiment includes an authorization layer in or associated with wireless charging solutions (e.g., adds an authorization protocol within or coupled to a wireless charging protocol). Conventional wireless charging schemes assume there is no reason to question the appropriateness of a receiver node seeking charge from a transmitter node. For example, a coffee shop offering a transmitter node (charging station) may assume a receiver node, placed within 10 mm of the transmitter node, belongs to a customer of the coffee shop and therefore should be able to charge the receiver node. In other words, conventional schemes assume the receiver node's proximity to the base station is a sufficient factor for authorizing the receiver node for charging. However, as longer distance charging schemes become more prevalent (e.g., WiTricity, which allows a receiver node to charge from one or more meters away from the transmitter node) such assumptions regarding authentication may be faulty or inadvisable. Furthermore, as the level of power or energy that can be inductively transferred increases, the need to account for that energy may be more important. For example, a charging station at an airport may include a pad transmitter to charge an automobile and the operator of the charging station may wish to charge for such a service based on the amount of energy transferred. Furthermore, a remote charging station in a dessert may rely on a large battery to supply charge to nodes (e.g., automobiles) and may need to supply the charge at a cost to the user that is draining the charge from the battery. Embodiments described herein, which provide authentication between the transmitter and receiver nodes, will make such accountability possible. Such an embodiment may not require much or any additional infrastructure to presently offered mobile computing nodes as it does not require network connectivity on the wireless transmitter side (instead relying on the receiver node for such infrastructure in some embodiments).

With an embodiment that is based on the EPID signature scheme, the embodiment uses EPID group membership as an authorization factor. Each mobile receiver node may be a member of one or more EPID groups, depending on the usage model. For example, one EPID group may correspond to Brand A (a group of automobile charging stations located across the country) and another EPID group may correspond to Brand B (a different group of automobile charging stations located across the same country). Of course in other embodiments the different EPID groups may relate to different wireless phone carriers (e.g., Sprint, ATT) and the like whereby the different EPID groups related to different technologies or different financial accounts.

In one EPID based embodiment, at least two basic modes of operation are available. First, EPID groups are pre-assigned to a receiver node when the receiver node is manufactured (i.e., the receiver node's original equipment manufacturer (OEM) is the EPID issuer). The manufacturer may negotiate business deals with venues providing wireless charging capabilities (e.g., airports, coffee shops) so the manufacture's receiver nodes (e.g., Smartphones) are allowed to charge at those venues. This may allow the OEM to market its receiver nodes as being compatible with a large number of charging station brands, thereby increasing the value of the receiver node in the eyes of the consumer. Second, EPID groups may be dynamically allocated to a receiver node by the receiver node executing an online "join protocol". In this case, the receiver node might permanently or temporarily join a given EPID group which is allowed to charge at a charging station. The EPID issuer entity in this case might be an independent software vendor (ISV) providing a subscription type of service. For example, a user may temporarily join an airline's EPID group for the user's flight on an airplane operated by the airline. However, such an EPID issuer entity may instead be a venue owner (e.g., a coffee shop owner) that provides the transmitter node with temporary access to the venue owner's charging station(s). These EPID signature schemes may utilize known EPID properties, such as blinded key issuing (e.g., given a membership proof, the verifier or the issuer cannot identify the actual prover (e.g., node 103), that is, cannot extract any identifiable information about the member from the proof), non-linkability (e.g., given two membership proofs, the verifier or the issuer cannot tell whether the proofs are generated by one member or by two different members), and flexible revocation methods (all discussed below and further discussed in, for example, Enhanced Privacy ID: A Remote Anonymous Attestation Scheme For Hardware Devices, E. Brickell et al., Intel Technology Journal, Vol. 13, Issue 2, 2009) are preserved in the above usage modes.

In an embodiment transmitter nodes serve as EPID verifiers and check if the mobile receiver node does indeed belong to a given EPID group. In an embodiment the transmitter nodes are relatively simple devices, with no direct network uplink, and are pre-programmed (by their respective OEMs) with valid public keys for a given EPID group as well as the keys needed to verify OCSP response validity. The EPID group identifiers allowed to charge at a given transmitter node may be pre-programmed to the transmitter node. The above mentioned data (e.g., keys, group IDs, and the like) may change at some point after power transmitters and/or receivers are deployed into the field (e.g., in the event of group revocation when, for example, when a key is compromised)(e.g., when a new valid EPID group is added to the EPID groups authenticated to operate with the transmitter node), the transmitter node may be reprogrammed (e.g., using a USB based drive, via a wired or wireless download from the internet, and the like). Updating this type of authentication data may utilize communications techniques (e.g., including piggy-backing 'sync' data in an authorization protocol), and the like.

Figure 1:
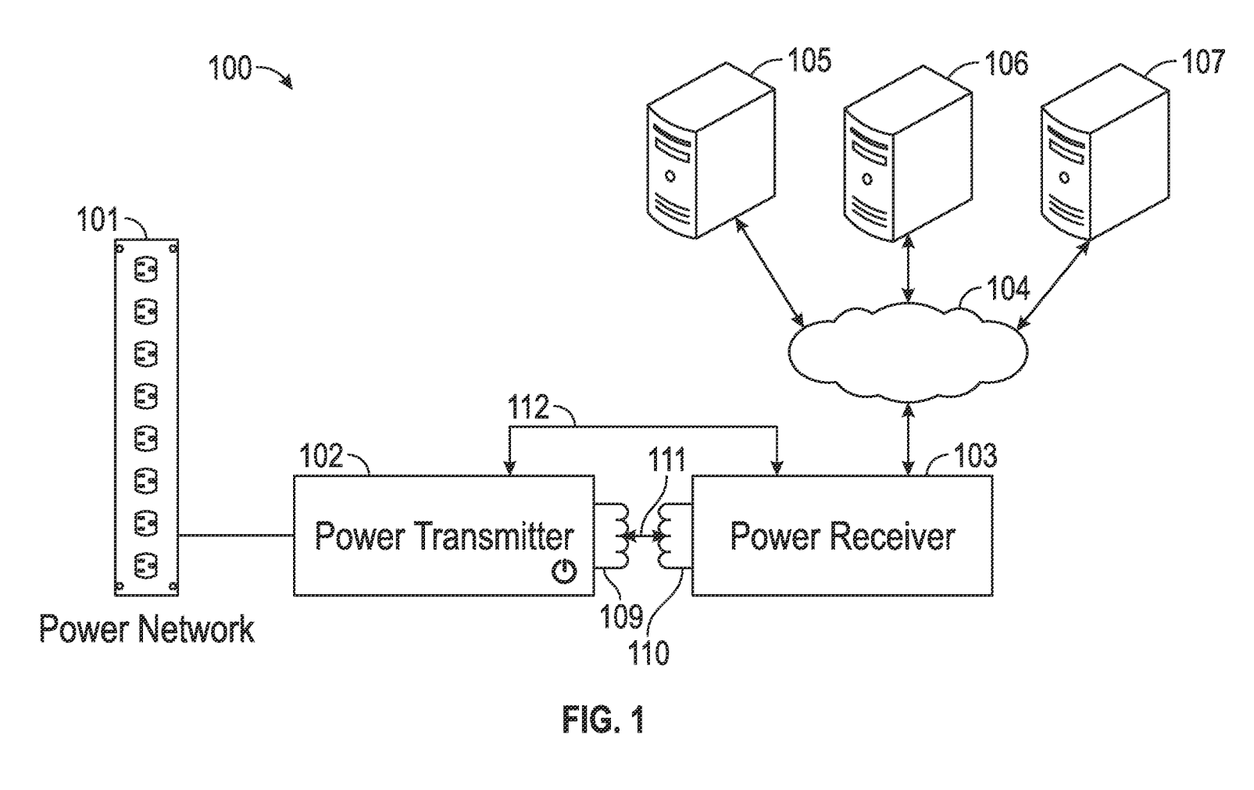
FIG. 1 includes a schematic representation of a charging eco-system in an embodiment of the invention.

FIG. 1 includes a schematic representation of a charging eco-system 100 in an embodiment. A power source 101, such as a main 230 V/50 Hz or 120 V/60 Hz power supply of a power grid, couples to power transmitter node 102. However, in other embodiments source 101 may be a battery, solar panel, or any other power source related to wind energy, geothermal energy, biofuel, nuclear power, hydrogen cells, and the like. Transmitter node 102 charges receiver node 103 using coils 109, 110, whereby magnetic field 111 couples the coils to one another. However, in an embodiment node 103 may need to first (or eventually) authenticate itself to node 102 via communication channel 112 (e.g., Bluetooth®, near field communication (NFC), and the like). To do so, as explained below, node 103 may need to join an EPID group by accessing (via internet 104) an EPID issuer node, such as a distantly located remote server node 105 or 106. Furthermore, as explained below, node 103 may need to prove its credentials are not listed in a revocation list managed by OCSP 107.

Figure 2:
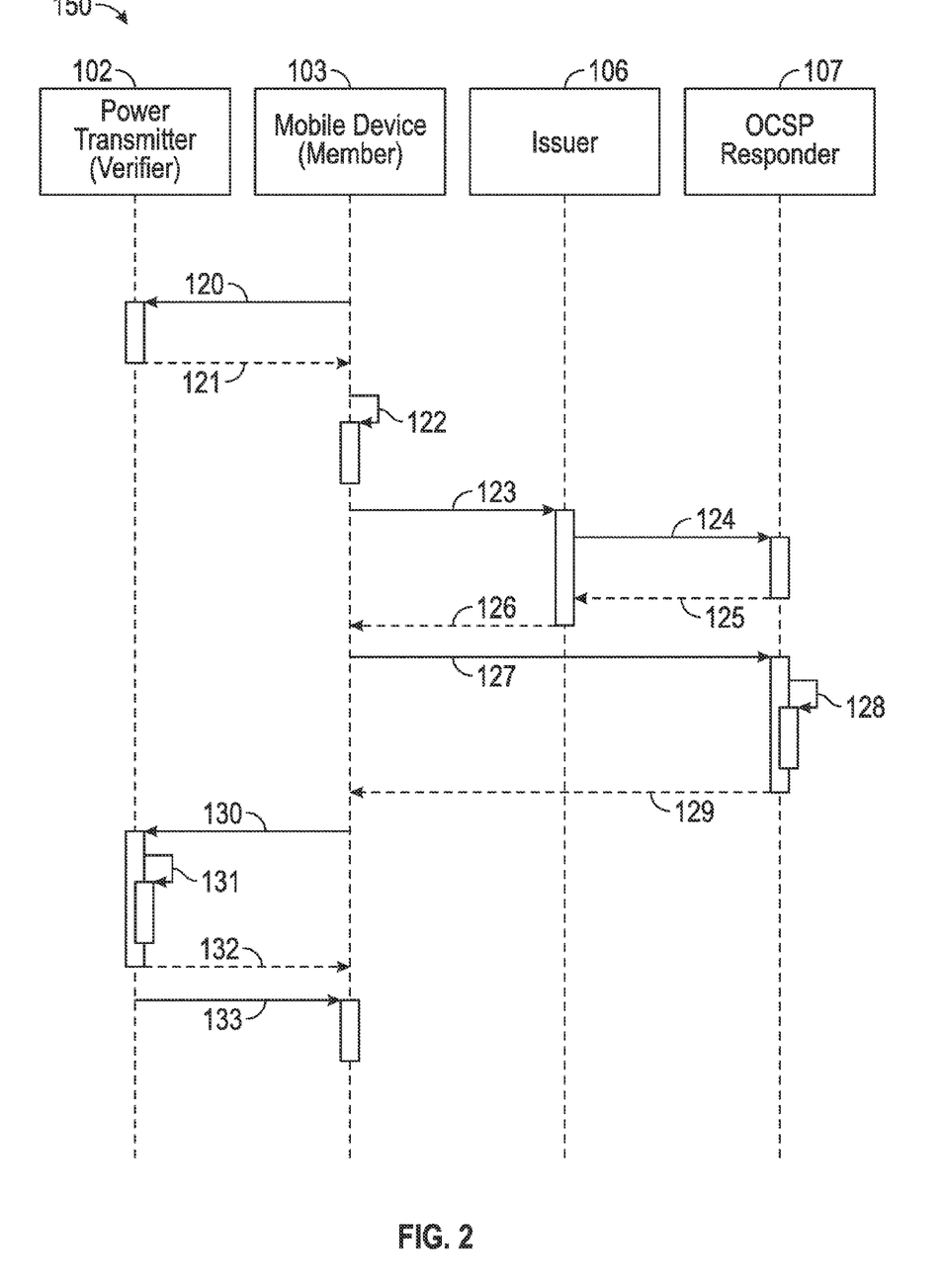
FIG. 2 includes methods for operation of various embodiments of the invention.

FIG. 2 includes a method 150 of authenticated wireless charging in an embodiment. FIG. 2 includes authorization steps taken before the receiver node is authorized to charge from the transmitter node. FIGS. 1 and 2 are discussed below.

By default, in one embodiment the power transmitter node 102 is off and does not provide any power for charging receiver nodes. For example, transmitter node 102 may not "awake" until "pinged" via a charging protocol, such as the Qi charging protocol mentioned above. For example, in the Qi protocol pinging may include the power transmitter 102 executing a digital ping, and listening for a response from node 103. If the power transmitter 102 discovers power receiver 103, node 102 may extend the digital ping (i.e., maintain the power signal at the level of the digital ping).

This may cause the system to proceed to the identification and configuration phases of the Qi protocol (or analogous phases of other protocols). If node 102 does not extend the digital ping, the system may revert to the selection phase of the Qi protocol where it searches for devices within its charging range.

To begin authentication of receiver node 103 to transmitter node 102, node 102 and/or node 103 establishes (element 120) a communication channel 112 (e.g., bi-directional communication channel) between each other. The channel 112 may be embedded in the charging protocol itself or provided out-of-band.

An "in-band" communications channel may include the data exchange embedded in the charging protocol itself and required for its primary function, which is charging (e.g., backscatter modulation-based communication in the Qi communication and control protocol). In contrast, an "out-of-band" (OOB) communication technology or technique does not affect the primary function of the power transmitter (i.e., delivering power) and the data transfer is decoupled or unrelated to the charging. For example, the aforementioned Bluetooth® communication channel may be considered OOB in some embodiments.

To establish channel 112 one embodiment uses a near NFC tag on the power transmitter node 102, which will bootstrap a full communication channel (e.g., using a Bluetooth® low energy (BLE) connection). When the communication channel 112 is established (e.g., via a direct anonymous attestation (DAA)-SIGMA communication channel), the mobile receiver node device 103 receives a list of valid EPID groups (element 121) allowed to charge at a given station (e.g., station 102) as well as a nonce (or challenge, transaction identifier, and the like), which may be embedded in OCSP responses obtained by the device, as discussed below. A SIGMA communication channel may include a communications protocol, developed by Intel Corp. (Santa Clara, Calif.), which sets up a secure session between an EPID based node that needs to be authenticated (node 103) and an EPID verifier (node 102).

At element 122 node 103 checks if it is already a member of one of the EPID groups that are valid for the transmitter 102. If receiver node 103 is a member of an approved EPID group, node 103 may skip to element 127 (addressed below). If receiver node 103 is not a member of such an EPID group, node 102 may execute an EPID "join protocol" to become a member of a valid EPID group (element 123) by contacting an EPID issuer node 106. Payment collection or other venue owner-specific steps may also be performed at stage 123. If the EPID join protocol fails, the authentication process 150 terminates at this point and node 103 does not receive charge from node 102. At element 124 EPID issuer node 106 updates OCSP responder node 107 with business rules regarding the newly-joined EPID member (e.g., setting timed expiration).

Regarding element 124 in more detail, in some embodiments this portion of the process allows for implementing finer-grained authorization logic and rules with the OCSP responder 107. For example, responder 107 may be controlled by the owner of power transmitter 102, but EPID Issuer 106 may or may not be owned by the owner of power transmitter 102 (i.e., issuer 106 and responder 107 are decoupled from one another in terms of control in some embodiments but not in others). In some embodiments element 124 may be optional as the OCSP responder 107 may have no business logic at all and may simply return a 'valid' type of response to all but revoked EPID certificate queries (e.g., behave as a regular OCSP responder). On the other hand, a venue owner (hosting his or her own OCSP responder) may choose to implement more complex access schemes (e.g., timer expiry). In such a scheme, the OCSP responder 107 may need to be notified of a new member joining so responder 107 can update its logic/triggers and the like. Furthermore in some applications and configurations (e.g., when elements 124-125 are omitted) OCSP responder 107 may choose to contact EPID Issuer 106 at element 128 to check certificate validity. In FIG. 2 that mode of communication is not reflected as that mode is not a part of the embodiment itself and follows typical configuration patterns of an OCSP responder and Certificate Authority (e.g., in the embodiment of FIG. 2, the Certificate Authority is an EPID Issuer (e.g., EPID Issuer will periodically update the OCSP responders with revocation lists)).

At elements 125, 126 the EPID provisioning process ends and node 103 is now a member of an approved EPID group. Elements 125, 126 (and others that are illustrated using dashed lines in FIG. 2) may include simple replies, such as acknowledgement (ACK) messages indicative a command being successfully executed. In an embodiment during elements 123-126 (i.e., the EPID join sequence) a new EPID private key would be generated (or provisioned) on the device 103 so there may be no particularly interesting data to return in element 126 (because relevant data is already on node 103). Details regarding the ability of a node, like node 103, to join an EPID group are available at, for example, Enhanced Privacy ID: A Remote Anonymous Attestation Scheme For Hardware Devices, E. Brickell et al., Intel Technology Journal, Vol. 13, Issue 2, 2009.

At element 127 node 103 prepares for authenticating with the power transmitter 102 by obtaining a valid OCSP response (from node 107) for an EPID certificate that node 103 will use for authentication with node 102. The OCSP response from node 107 is replay-attack-protected by embedding the nonce (provided by transmitter 102 in element 121) at element 128. An embodiment uses a nonce that is similar to a one-time "token" that ties the OCSP response to the specific request from the power transmitter (obtained in element 121) so the OCSP response is valid only for that particular query/transaction. If the mobile device were to store/cache the OCSP response and save it for later use (trying to abuse the previously obtained "allowed to charge" permit), the transmitter would reject that response on subsequent attempts.

In an embodiment OCSP responder 107 performs additional checks to enforce business rules regarding wireless charging (e.g., timed expiration). At element 129 the method returns to node 103. In an embodiment, in element 129 an OCSP response is returned. If the embodiment is configured to embed a configuration package for the power transmitter in the response of element 129, the configuration package may be included in the response of element 129.

Embodiments using protected communication channel protocols, such as EPID-SIGMA communication channels, may perform certain actions at element 129. For example, since EPID supports a signature-based revocation mode in which a client's private key can be revoked without the revoking party actually knowing the private key (i.e., by just revoking one of the signatures issued by the problematic private key), the EPID member 103 may need to calculate a so-called non-revoked proof(s) at this stage and present the proof (at element 130) to the EPID verifier 102. The list of proofs that need to be generated by node 103 will come from OCSP responder 107 and be available both to the power receiver 103 (to calculate proofs) and the power transmitter 102 (to verify them and their completeness). However, other embodiments may disable signature-based revocation altogether.

At element 130, node 103 signs a message (e.g., a message containing text representation of a group ID) with its EPID private key, and sends the message, along with OCSP response(s) from node 107, to the power transmitter 102. Transmitter node 102 checks validity of the EPID signature (checking for revocations based on a list of corrupted private keys or a list of signatures made from suspected extracted keys) at element 131, wherein authentication is achieved or denied. The list of corrupted private keys and/or list of signatures made from suspected extracted keys may be delivered in several ways. For example, the list(s) may be setup manually/pre-programmed in a device (nodes 102 or 103) or transferred over in the "OCSP response" (e.g., element 129).

At element 132 an acknowledgement of authentication may be sent to node 103. Furthermore, charging configuration communications between nodes 102, 103 may occur. For example, with the Qi protocol these communications may concern identification and configuration phases. In these phases, node 102 identifies the selected node 103, and obtains configuration information such as the maximum amount of power that node 103 intends to provide at its output. Node 102 uses this information to create a Power Transfer Contract (or something analogous in charging protocols other than the Qi protocol). This Power Transfer Contract contains limits for several parameters that characterize the power transfer in the power transfer phase. The Power Transfer Contract includes a set of boundary conditions on the parameters that characterize the power transfer from a power transmitter charging station to a power receiver node. Violation of any of these boundary conditions causes the power transfer to abort in some embodiments.

At element 133, if the EPID signature from node 103 is valid the receiver node 103 is considered authenticated and the transmitter 102 starts transmitting power to node 103. For example, in the Qi protocol at this phase node 102 continues to provide power to node 103, adjusting its primary cell current in response to control data that it receives from node 103 (i.e., power transfer may occur before authentication is complete but, upon failure to authenticate, power transfer may be discontinued). Throughout the charging phase, node 102 monitors the parameters that are contained in the Power Transfer Contract. A violation of any of the stated limits on any of those parameters causes node 102 to abort the power transfer. The system may also leave the power transfer phase on request of node 103. For example, node 103 can request to terminate the power transfer—battery fully charged—reverting the system to the selection phase where it searches for other receivers, or request to renegotiate the Power Transfer Contract—change to trickle charging the battery using a lower maximum amount of power—reverting the system to the identification and configuration phase where the Power Transfer Contract is renegotiated.

As mentioned above, authentication may occur at varying points. Authentication may occur before or after charging begins. Authentication may occur before after any Power Transfer Contract (i.e., communications that dictate the charging parameters (configuration) for a charging session) negotiation commences.

In embodiments varying security measures may be used. For example, a SIGMA communication channel protocol may be used to set up a secure session between an EPID prover and verifier (e.g., see element 120 of FIG. 2 carried out according to EPID and SIGMA protocol specifications). SIGMA channels are addressed more thoroughly at, for example, Key Exchange with Anonymous Authentication using DAA-SIGMA Protocol, Jesse Walker and Jiangtao Li, Intel Labs, INTRUST, volume 6802 of Lecture Notes in Computer Science, page 108-127. Springer, (2010). Embodiments may require that nodes 102 and/or 103 be able to provide a hardware-based root of trust for authentication purposes using, for example, the SIGMA protocol.

Figure 3:
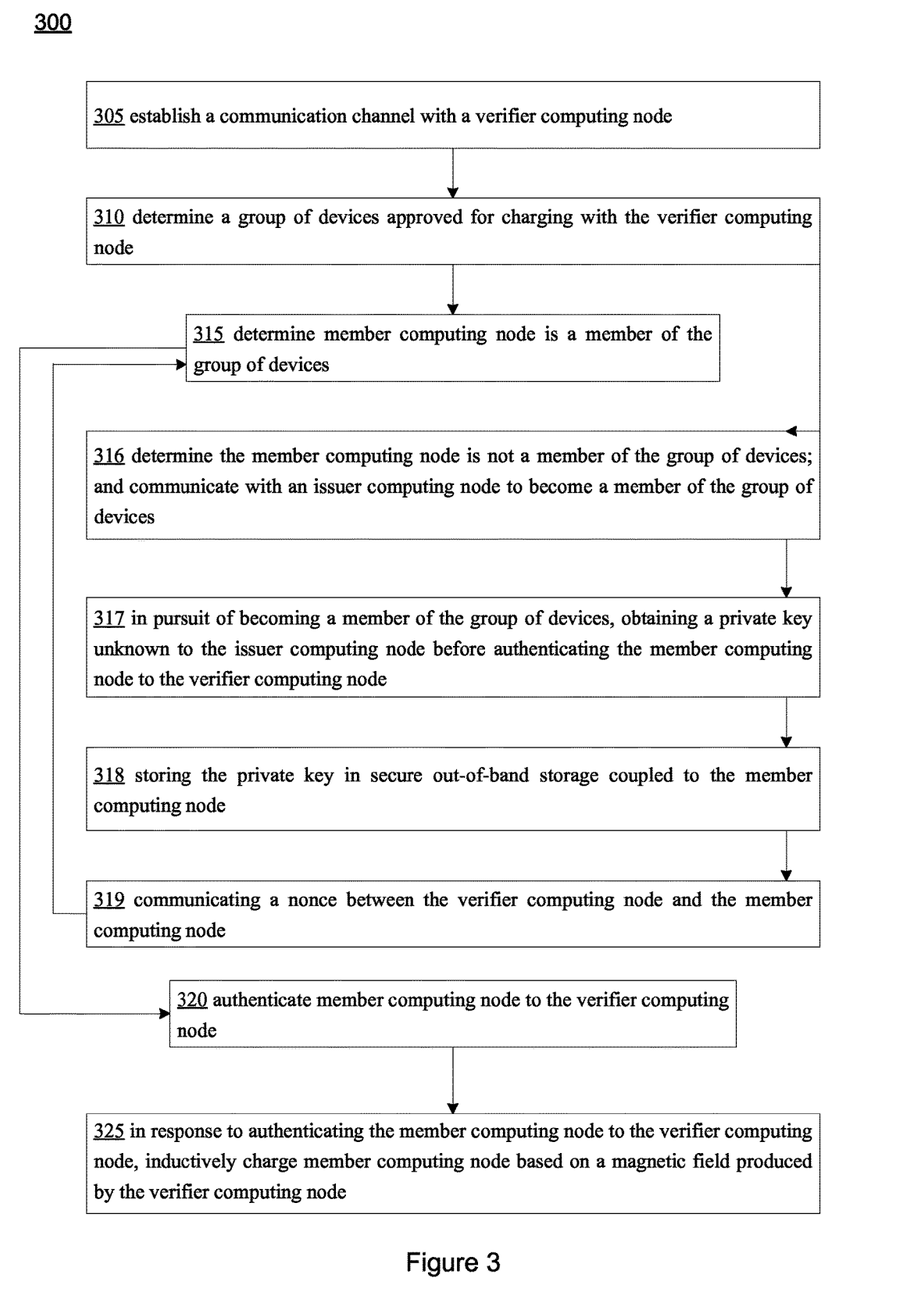
FIG. 3 includes a method for operation of an embodiment of the invention.

FIG. 3 includes a method 300 for operation of an embodiment of the invention. Method 300 may be executed by at least one processor of a member computing node, such as node 103. Block 305 includes establishing a communication channel (e.g., channel 112) with a verifier computing node, such as node 102. The member computing node and the verifier computing node are each coupled to a respective charging coil (e.g., coils 109, 110). Block 310 includes determining a group of devices approved for charging with the verifier computing node. Bock 315 includes determining the member computing node is a member of the group of devices. Block 320 includes authenticating the member computing node to the verifier computing node. Block 325 includes, in response to authenticating the member computing node to the verifier computing node, inductively charging the member computing node based on a magnetic field produced by the verifier computing node.

Regarding block 320, the authentication may comprise anonymously authenticating the member computing node to the verifier computing node, wherein the member computing node does not uniquely identify itself to the verifier computing node. This may use a protocol such as, for example, EPID described above and within Enhanced Privacy ID: A Remote Anonymous Attestation Scheme For Hardware Devices, E. Brickell et al., Intel Technology Journal, Vol. 13, Issue 2, 2009. Anonymously authenticating the member computing node to the verifier computing node may comprise the member computing node signing a message with a private key and communicating the signed message to the verifier computing node. The private key and a plurality of other private keys may all correspond to a public key coupled to the verifier computing node.

Anonymously authenticating the member computing node to the verifier computing node may comprise, in an embodiment, the member computing node performing a zero-knowledge membership proof with the verifier computing node. A zero-knowledge proof or zero-knowledge protocol is a method by which one party (the prover) can prove to another party (the verifier) that a given statement is true, without conveying any information apart from the fact that the statement is indeed true. In an EPID scheme, such a proof proves knowledge of a secret (e.g., private key) such that (1) the verifier is convinced of the proof and yet (2) the proof does not leak any information about the secret to the verifier. This concept is not necessarily only tied to EPID proofs but is possible with other zero-knowledge proofs. However, embodiments implementing EPID may benefit because not only does the prover not reveal any information about its private key to the verifier (thus preventing the verifier from impersonating him) but the prover also does not reveal any identifiable information about itself (e.g., one cannot check if it is in fact a particular prover being authenticated).

The signature based on the private key may be based on at least one of a list of corrupted private keys and a list of signatures. This may be implemented using, for example, EPID related protocols. With embodiments using EPID related protocols for revocation capabilities, EPID revocation lists include GROUP-RL (Group Revocation List-contains numbers of groups which were revoked), SIG-RL (Signature Revocation List-contains a list of revoked signatures), PRIV-RL (Private Key Revocation List-contains a list of revoked private keys). In other words, with EPID based embodiments signatures are not necessarily the only items put on the revocation lists. Also, in an embodiment the OCSP response may be perceived as another source of revocation information (e.g., the OCSP responder may return an 'invalid' status for a given certificate query at its own discretion, where the invalid status is unrelated to all of the revocations but instead based only on the business rules implemented with the responder (e.g., venue is temporarily closed and no one is allowed to use charging station belonging to or operated by venue)).

Block 316 addresses the issue where the receiver node is not already a member of an allowed group. In such a case the receiver node communicates with an issuer computing node to become a member of the group of devices. For example, this includes elements 123-126 of FIG. 2.

Block 317 addresses the receiver node, in pursuit of becoming a member of an allowed group, obtaining (e.g., self-generating) a private key unknown to the issuer computing node before authenticating the member computing node to the verifier computing node.

An embodiment includes communicating a membership credential between the member computing node and an issuer computing node. This credential may be based on, for example, a unique membership key chosen by the member node. The signature mentioned above (i.e., signing the message with the private key) may be signed based on the membership credential. For example, the private key may be generated based on both the membership credential and the unique membership key. To sign a signature the member node may provide in zero-knowledge that it has a credential based on the unique membership key. In an embodiment, the private key is based on a base value and a pseudonym and the base value and the pseudonym may be included in a revocation list (e.g., "B" and "K" of Enhanced Privacy ID: A Remote Anonymous Attestation Scheme For Hardware Devices, E. Brickell et al., Intel Technology Journal, Vol. 13, Issue 2, 2009).

Block 318 includes storing the private key in secure out-of-band storage coupled to the member computing node. For example, this storage may be in a Trusted Product Module (TPM). However, in some embodiments key storage is optional (e.g., a volatile, generated-per-use key may be in use with no need to store the volatile key).

Block 319 includes communicating a nonce between the verifier computing node and the member computing node. In an embodiment the signed message of block 320 is based on the nonce. In an embodiment the zero-knowledge membership proof addressed above regarding block 320 is based on the nonce.

Referring to both blocks 320 and 317 discussed above, in an embodiment anonymously authenticating the member computing node to the verifier computing node comprises the member computing node performing a zero-knowledge membership proof with the verifier computing node, the zero-knowledge membership proof being based on the base value and the pseudonym.

Referring again to block 310, block 310 includes determining a group of devices approved for charging with the verifier computing node. This may be based on receiving such information from a verifier node. However, this may also be based on, for example, the member node consulting information located elsewhere (e.g., within the member node or coupled to member node over a network). Bock 315 includes determining the member computing node is a member of the group of devices. This may be, for example, based on successful authentication (i.e., node 103 is a member of an acceptable group if node 103 is successfully authenticated). Blocks 310, 315 do not necessarily have to precede charging. Block 325 includes charging in response to authentication but that does not mean no charging occurs before authentication (i.e., may include continued charging or additional charging). An embodiment may include a version of process 300 wherein blocks 310, 315 are omitted and the member node attempts authentication without practicing the techniques of blocks 310 and/or 315.

Not all embodiments require anonymous authentication. For example, an embodiment uses a version of EPID that is highly configurable such that the anonymous authentication is an optional feature. For example, the embodiment uses an EPID signature with a pre-assigned basename and which provides a linkable response.

As used herein, an anonymous authentication does not necessarily mean no accounting may take place. For example, a transmitter may authenticate a receiver without knowing the specific identity of the receiver. However, the receiver may still be billed for the charge transferred. For example, different embodiments may accommodate different payment schemes.

An embodiment concerning pay-before-use scenarios or subscription services the anonymity on authorization event is not an issue since billing may occur based on the 'EPID join' event (or an enrollment/activation event). In such a case the device can then authenticate with all of the 'compatible' power transmitters without need for tracking, thereby making the anonymity feature desirable to certain users. In an embodiment, the 'join' event would not likely be anonymous, as it involves payment, invoicing, and the like (but the authentication may be anonymous to the transmitter). Thus, there would be anonymous authorization on the charging event itself because it is the 'frequent' part and done in potentially unknown (or even hostile) environment(s).

An embodiment concerning a pay-after-use scenario may opt to have anonymity features, if available, disabled if an accounting entity needs to be able to trace the transactions being made. In addition, even the embodiment includes a protocol, such as an EPID protocol, that does not allow disablement of anonymity, embodiments may still use a protocol that make the transactions linkable (e.g., by forcing the device to present some additional/unique token before obtaining a valid OCSP response). In such a scenario a portion of the transmitter/receiver interface will be anonymous while other interactions for the receiver (e.g., with OCSP responder) are not anonymous.

Figure 4:
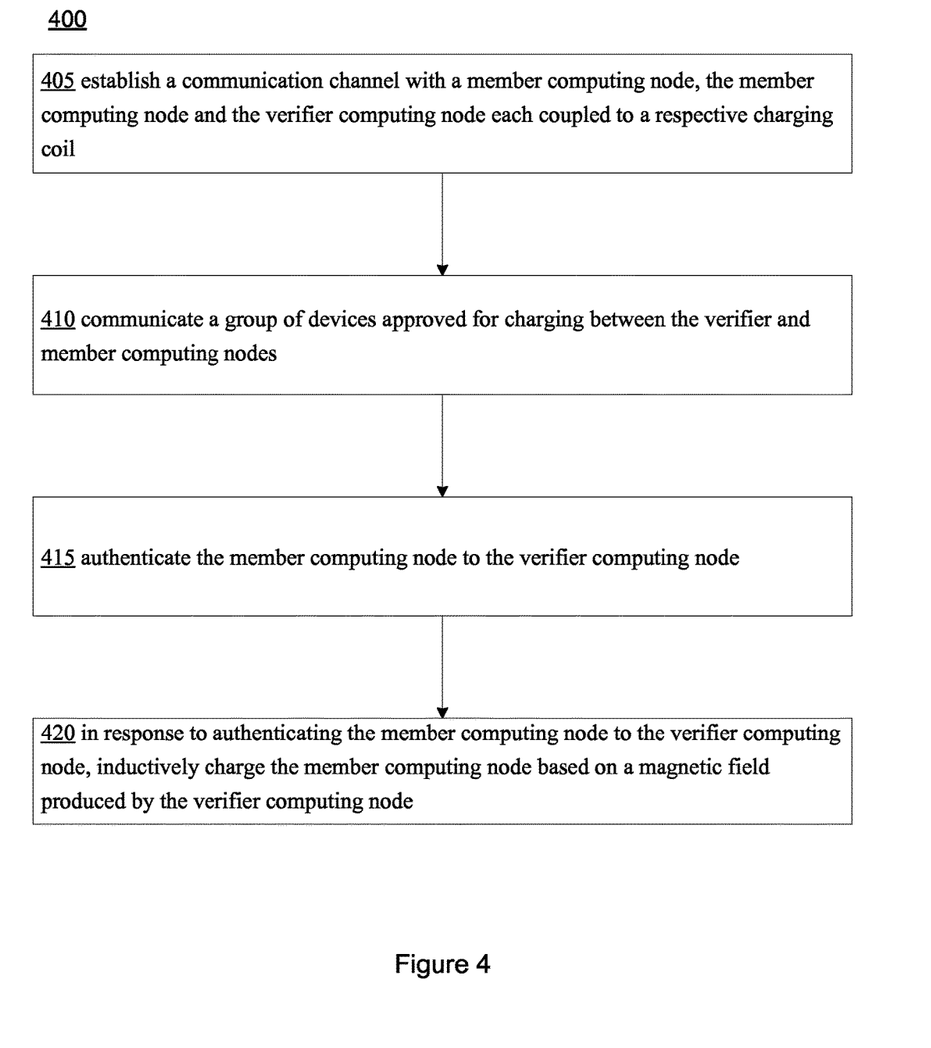
FIG. 4 includes a method for operation of an embodiment of the invention.

FIG. 4 includes a method 400 for operation of an embodiment of the invention. Block 405 includes the charging node/verifier node establishing a communication channel with a member computing node, the member computing node and the verifier computing node each coupled to a respective charging coil.

Block 410 includes the verifier node communicating a group of devices approved for charging between the verifier and member computing nodes. This may be as simple as communicating an identifier of the transmitter to the receiver so the receiver understands what protocol should be used to communicate and/or charge with the transmitter. This may be as simple as the receiver communicating a message to the transmitter and the transmitter acknowledging the message if that acknowledgement, broadly or narrowly, identifies the transmitter. For example, a verifier communicating its identity as "Transmitter Brand X" to a receiver may be construed as the verifier communicating that a group of devices, such as "Device Brand Y" or "Device Generation Q" (which has the requisite minimum hardware capabilities needed for charging with the transmitter), is approved for charging. Other examples include communicating a list of EPID group numbers between the transmitter and receiver nodes (e.g., communicating list from the transmitter to the receiver). The list may identify (directly or indirectly) group numbers allowed to charge at a given transmitter. As a result, the receiver (e.g., mobile device) can quickly determine upfront (a) if it is allowed to charge and begin the authorization protocol, or (b) if receiver instead needs to pursue the 'join' protocol to become a member of one of the valid EPID groups.

Block 415 includes the verifier node authenticating the member computing node to the verifier computing node. Block 420 includes the verifier node, in response to authenticating the member computing node to the verifier computing node, inductively charging the member computing node based on a magnetic field produced by the verifier computing node.

Embodiments discussed herein may utilize a system such as the system of FIG. 5, discussed below. The system of FIG. 5 may be used for, as an example, nodes 102, 103, 106, and/or 107. In fact, embodiments may be used in many different types of systems. For example, in one embodiment a communication device can be arranged to perform the various methods (e.g., FIG. 3) and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

A module as used herein refers to any hardware, software, firmware, or a combination thereof. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices. However, in another embodiment, logic also includes software or code integrated with hardware, such as firmware or micro-code. Modules addressed in Examples 22-23 below may be included in, for example, chipset 1090 (FIG. 5), processors 1070, 1080, or coupled thereto.

Figure 5:
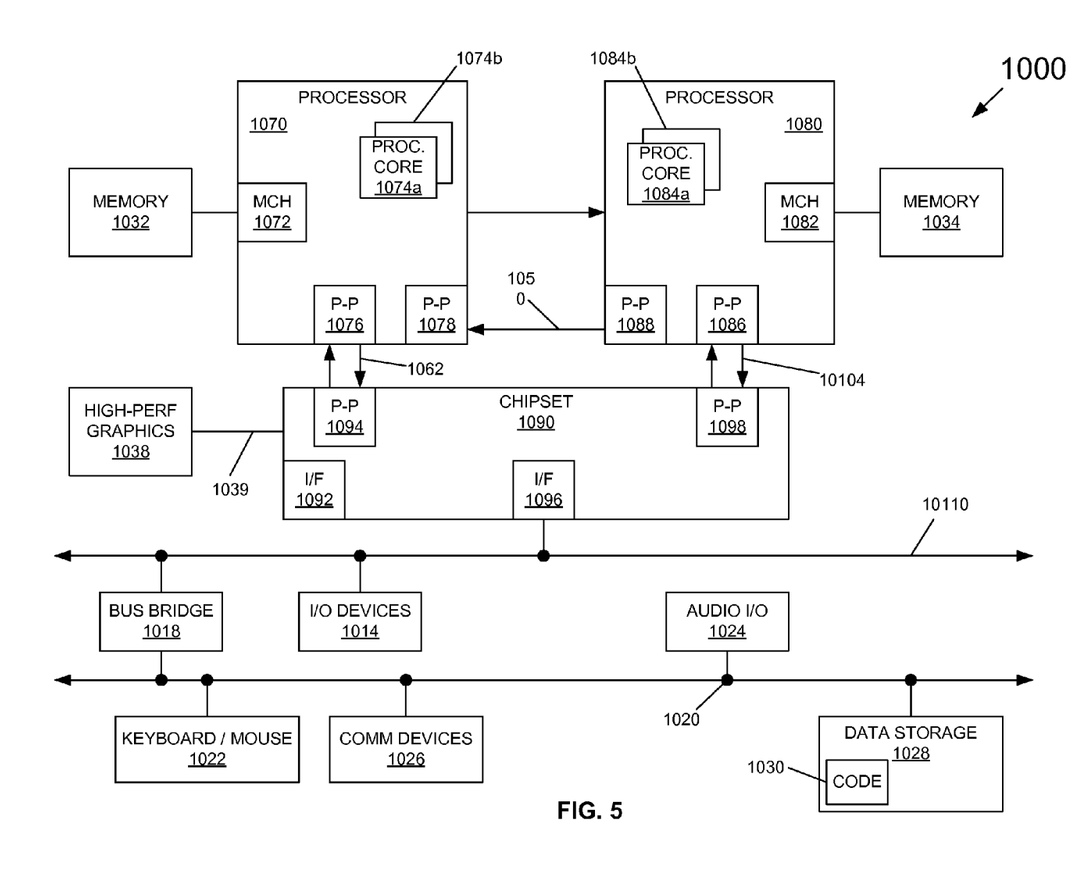
FIG. 5 includes a system for use with an embodiment of the invention.

Referring now to FIG. 5, shown is a block diagram of a system embodiment 1000 in accordance with an embodiment of the present invention. System 1000 may be included in, for example, a mobile computing node such as a cellular phone, smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074*a* and 1074*b* and processor cores 1084*a* and 1084*b*). Such cores 1074, 1074*b*, 1084*a*, 1084*b* may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074*a*, 1074*b* and 1084*a*, 1084*b*, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discreet logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Note that other embodiments are contemplated. For example, instead of the point-to-point architecture shown, a system may implement a multi-drop bus or another such communication topology. Also, the elements of FIG. 5 may alternatively be partitioned using more or fewer integrated chips than shown in the FIG. 5.

An embodiment may not require an internet link at various nodes. For example, both the EPID member key for the receiver node 103 and the public key for EPID membership verification on the transmitter node 102 may be pre-programmed to devices 102, 103 at the time those devices are manufactured. Such an embodiment may lack any policy enforcement component (e.g. no OCSP responders) and any revocation capabilities, but still be able to authenticate the receivers to power transmitters, provided that the transmitters have the valid group membership verification keys pre-programmed (e.g. as part of device setup).

Embodiments are not limited to EPID schemes and may use other authorization schemes. For example, any of numerous group signature schemes known to a person of ordinary skill in the art would work in embodiments of the invention. Such embodiments may have lesser capability in terms of revocation capabilities and privacy aspects that EPID provides, but that is not necessarily the case. Direct Anonymous Attestation (DAA), ACJT 2000, BBS04, BS04, and others are schemes used in various embodiments. In fact, some embodiments may not require anonymity or group ids as long as the receiver node is authenticated to the transmitter node.

As mentioned above, updating authentication data may utilize communications techniques (e.g., including piggy-backing 'sync' data in an authorization protocol), and the like. For example, an embodiment may include configuration data (or a delta configuration package) in the messages exchanged by the power receiver (e.g., node 103) and power transmitter (e.g., node 102) in order to successfully authenticate the receiver to the transmitter. As an example, instead of using a bare OCSP response, the merchant-operated server (hosting an OCSP responder, such as node 107) may return a signed (or even encrypted) configuration data package (or a 'nothing for you has changed' type of message) as well as an actual OCSP response. The configuration data package would then be transferred as-is back to the power transmitter and verified/applied there upon verification of its validity. Above references to 'piggy-backing' the 'sync' data are used because some embodiments do in fact use a receiver's internet uplink as a surrogate of the transmitter. The aforementioned 'sync' data will be embedded in the transmitter/receiver authorization protocol so the transmitter will have a reasonable guarantee that the (1) receiver will include authentication data, and (2) the authentication data can be trusted. Above references to 'sync' data refer to (re)configuration/device management data that may flow to/from the power transmitter owner and the actual transmitter and include control messages to and from the transmitter and receiver.

At times above an "EPID join" protocol is addressed. However, some embodiments do not use such a protocol and may instead use any of various "group join" protocols. For example, an embodiment may use a version of EPID (or some other scheme) that supports only a private key generation logic and the 'join' part of the scheme is executed by an issuer generating the keys by itself and then distributing the keys to target devices.

Example 1 includes a method executed by at least one processor of a member computing node comprising: establishing a communication channel with a verifier computing node, the member computing node and the verifier computing node each coupled to a respective charging coil; determining a group of devices approved for charging with the verifier computing node; determining the member computing node is a member of the group of devices; authenticating the member computing node to the verifier computing node; in response to authenticating the member computing node to the verifier computing node, inductively charging the member computing node based on a magnetic field produced by the verifier computing node.

In example 2 the subject matter of Example 1 can optionally include anonymously authenticating the member computing node to the verifier computing node, wherein the member computing node does not uniquely identify itself to the verifier computing node.

In example 3 the subject matter of Examples 1-2 can optionally include wherein the anonymously authenticating the member computing node to the verifier computing node comprises the member computing node signing a message with a private key and communicating the signed message to the verifier computing node.

In example 4 the subject matter of Examples 1-3 can optionally include wherein the private key and a plurality of other private keys all correspond to a public key coupled to the verifier computing node.

In example 5 the subject matter of Examples 1-4 can optionally include determining the member computing node is not a member of the group of devices; and communicating with an issuer computing node to become a member of the group of devices.

In example 6 the subject matter of Examples 1-5 can optionally include wherein the private key is unknown to the issuer computing node before authenticating the member computing node to the verifier computing node.

In example 7 the subject matter of Examples 1-6 can optionally include comprising the member computing node storing the private key in secure out-of-band storage coupled to the member computing node.

In example 8 the subject matter of Examples 1-7 can optionally include wherein the anonymously authenticating the member computing node to the verifier computing node comprises the member computing node performing a zero-knowledge membership proof with the verifier computing node.

In example 9 the subject matter of Examples 1-8 can optionally include wherein the membership proof is unlinkable. In example 10 the subject matter of Examples 1-9 can optionally include wherein the signed message is based on at least one of a list of corrupted private keys and a list of signatures.

In example 10 the subject matter of Examples 1-9 can optionally include wherein the signed message is based on at least one of a list of corrupted private keys and a list of signatures.

In example 11 the subject matter of Examples 1-10 can optionally include communicating a nonce between the verifier computing node and the member computing node; wherein the signed message is based on the nonce.

In example 12 the subject matter of Examples 1-11 can optionally include wherein the anonymously authenticating the member computing node to the verifier computing node comprises the member computing node performing a zero-knowledge membership proof with the verifier computing node; wherein the zero-knowledge membership proof is based on the nonce.

Example 13 includes a method executed by a processor comprising: communicating a membership credential between the member computing node and an issuer computing node, wherein signing the message with the private key comprises signing the message based on the membership credential.

In example 14 the subject matter of Example 13 can optionally include wherein the private key is based on the membership credential and an additional membership key In example 15 the subject matter of Examples 13-14 can optionally include wherein the private key is based on a base value and a pseudonym and the base value and the pseudonym are included in a revocation list.

In example 16 the subject matter of Examples 13-15 can optionally include wherein the anonymously authenticating the member computing node to the verifier computing node comprises the member computing node performing a zero-knowledge membership proof with the verifier computing node, the zero-knowledge membership proof being based on the base value and the pseudonym.

Example 17 includes a method executed by at least one processor of a verifier computing node comprising: establishing a communication channel with a member computing node, the member computing node and the verifier computing node each coupled to a respective charging coil; communicating a group of devices approved for charging between the verifier and member computing nodes; authenticating the member computing node to the verifier computing node; in response to authenticating the member computing node to the verifier computing node, inductively charging the member computing node based on a magnetic field produced by the verifier computing node.

In example 18 the subject matter of Example 17 can optionally include anonymously authenticating the member computing node to the verifier computing node, wherein the verifier node does not receive an identifier that uniquely identifies the member computing node to the verifier computing node.

In example 19 the subject matter of Examples 17-18 can optionally include wherein the authenticating the member computing node to the verifier computing node comprises the verifier computing node receiving a signed message that is signed with a private key known to the member computing node but not the verifier computing node.

In example 20 the subject matter of Examples 17-19 can optionally include authenticating the member computing node to the verifier computing node based on at least one of a list of corrupted private keys and a list of signatures.

In example 21 the subject matter of Examples 17-20 can optionally include wherein the anonymously authenticating the member computing node to the verifier computing node comprises the member computing node performing a zero-knowledge membership proof with the verifier computing node, the zero-knowledge membership proof being based on the base value and the pseudonym.

Example 22 includes at least one machine readable medium comprising a plurality of instructions that in response to being executed on a computing device, cause the computing device to carry out a method according to any one of examples 1 to 21.

Example 23 includes an apparatus comprising means for performing any one of examples 1 to 21.

Example 24 includes an apparatus comprising a member computing node the further comprises: at least one memory; at least one processor coupled to the memory: a communication module coupled to the at least one processor to establish a communication channel with a verifier computing node, the member computing node and the verifier computing node each coupled to a respective charging coil; a determining module to determine the member computing node is a member of a group of devices approved for charging with the verifier computing node; an authentication module to authenticate the member computing node to the verifier computing node; in response to authenticating the member computing node to the verifier computing node, a charging module to inductively charge the member computing node based on a magnetic field produced by the verifier computing node.

In Example 25 the subject matter of Example 23 can optionally include a private key to authenticate the member computing node to the verifier computing node based on signing a message with the private key and communicating the signed message to the verifier computing node.

Example 1a includes a member computing node including at least one processor and comprising: means for establishing a communication channel with a verifier computing node, the member computing node and the verifier computing node each coupled to a respective charging coil; means for determining a group of devices approved for charging with the verifier computing node; means for determining the member computing node is a member of the group of devices; means for authenticating the member computing node to the verifier computing node; in response to authenticating the member computing node to the verifier computing node, means for inductively charging the member computing node based on a magnetic field produced by the verifier computing node.

Example 2a includes the node of example 1a comprising means for anonymously authenticating the member computing node to the verifier computing node, wherein the member computing node does not uniquely identify itself to the verifier computing node.

Example 3a includes the node of example 2a, wherein the means for anonymously authenticating the member computing node to the verifier computing node comprises means for the member computing node signing a message with a private key and communicating the signed message to the verifier computing node.

Example 4a includes the node of example 3a, wherein the private key and a plurality of other private keys all correspond to a public key coupled to the verifier computing node.

Example 5a include the node of example 4a comprising: means for determining the member computing node is not a member of the group of devices; and means for communicating with an issuer computing node to become a member of the group of devices.

Example 6a include the node of example 5a, wherein the private key is unknown to the issuer computing node before authenticating the member computing node to the verifier computing node.

Example 7a includes the node of example 4a comprising the member computing node having means for storing the private key in secure out-of-band storage coupled to the member computing node.

Example 8a includes the node of example 3a, wherein the means for anonymously authenticating the member computing node to the verifier computing node comprises means for the member computing node performing a zero-knowledge membership proof with the verifier computing node.

Example 9a includes the node of example 8a wherein the membership proof is unlinkable.

Example 10a includes the node of example 3a, wherein the signed message is based on at least one of a list of corrupted private keys and a list of signatures.

Example 11a includes the node of example 10a comprising means for communicating a nonce between the verifier computing node and the member computing node; wherein the signed message is based on the nonce.

Example 12a includes the node of example 11a, wherein the means for anonymously authenticating the member computing node to the verifier computing node comprises means for the member computing node performing a zero-knowledge membership proof with the verifier computing node; wherein the zero-knowledge membership proof is based on the nonce.

Example 13a includes the node of example 3a, comprising means for communicating a membership credential between the member computing node and an issuer computing node, wherein the means for signing the message with the private key comprises means for signing the message based on the membership credential.

Example 14a includes the node of example 3a, wherein the private key is based on the membership credential and an additional membership key.

Example 15a includes the node of example 14a, wherein the private key is based on a base value and a pseudonym and the base value and the pseudonym are included in a revocation list.

Example 16a includes the node of example 15a, wherein the means for anonymously authenticating the member computing node to the verifier computing node comprises means for the member computing node performing a zero-knowledge membership proof with the verifier computing node, the zero-knowledge membership proof being based on the base value and the pseudonym.

Example 17a includes a member computing node including at least one processor and comprising: means for establishing a communication channel with a member computing node, the member computing node and the verifier computing node each coupled to a respective charging coil; means for communicating a group of devices approved for charging between the verifier and member computing nodes; means for authenticating the member computing node to the verifier computing node; in response to authenticating the member computing node to the verifier computing node, means for inductively charging the member computing node based on a magnetic field produced by the verifier computing node.

Example 18a includes the node of example 17a comprising means for anonymously authenticating the member computing node to the verifier computing node, wherein the verifier node does not receive an identifier that uniquely identifies the member computing node to the verifier computing node.

Example 19a includes the node of claim 17a, wherein the means for authenticating the member computing node to the verifier computing node comprises means for the verifier computing node receiving a signed message that is signed with a private key known to the member computing node but not the verifier computing node.

Example 20a includes the node of claim 17a comprising means for authenticating the member computing node to the verifier computing node based on at least one of a list of corrupted private keys and a list of signatures.

Example 21a includes the node of example 17a, wherein the means for anonymously authenticating the member computing node to the verifier computing node comprises means for the member computing node performing a zero-knowledge membership proof with the verifier computing node, the zero-knowledge membership proof being based on the base value and the pseudonym.

Example 1b includes at least one storage medium having instructions stored thereon for causing a member computing node to: establish a communication channel with a verifier computing node, the member computing node and the verifier computing node each coupled to a respective charging coil; determine a group of devices approved for charging with the verifier computing node; determine the member computing node is a member of the group of devices;

authenticate the member computing node to the verifier computing node; in response to authenticating the member computing node to the verifier computing node, inductively charge the member computing node based on a magnetic field produced by the verifier computing node.

Example 2b includes the at least one medium of example 1b comprising instructions to anonymously authenticate the member computing node to the verifier computing node, wherein the member computing node does not uniquely identify itself to the verifier computing node.

Example 3b includes the at least one medium of example 2b, wherein the anonymously authenticating the member computing node to the verifier computing node comprises the member computing node signing a message with a private key and communicating the signed message to the verifier computing node.

Example 4b includes the at least one medium of example 3b, wherein the private key and a plurality of other private keys all correspond to a public key coupled to the verifier computing node.

Example 5b includes the at least one medium of example 4b comprising instructions to: determine the member computing node is not a member of the group of devices; and communicate with an issuer computing node to become a member of the group of devices.

Example 6b includes the at least one medium of example 5b, wherein the private key is unknown to the issuer computing node before authenticating the member computing node to the verifier computing node.

Example 7b includes the at least one medium of example 4b comprising instructions to cause the member computing node to store the private key in secure out-of-band storage coupled to the member computing node.

Example 8b includes the at least one medium of example 3b, wherein the anonymously authenticating the member computing node to the verifier computing node comprises the member computing node performing a zero-knowledge membership proof with the verifier computing node.

Example 9b includes the at least one medium of example 8b wherein the membership proof is unlinkable.

Example 10b includes the at least one medium of example 3b, wherein the signed message is based on at least one of a list of corrupted private keys and a list of signatures.

Example 11b includes the at least one medium of example 10b comprising instructions to communicate a nonce between the verifier computing node and the member computing node; wherein the signed message is based on the nonce.

Example 12b includes the at least one medium of example 11b, wherein the anonymously authenticating the member computing node to the verifier computing node comprises the member computing node performing a zero-knowledge membership proof with the verifier computing node; wherein the zero-knowledge membership proof is based on the nonce.

Example 13b includes the at least one medium of example 3b comprising instructions to communicate a membership credential between the member computing node and an issuer computing node, wherein signing the message with the private key comprises signing the message based on the membership credential.

Example 14b includes the at least one medium of example 3b, wherein the private key is based on the membership credential and an additional membership key.

Example 15b includes the at least one medium of example 14b, wherein the private key is based on a base value and a pseudonym and the base value and the pseudonym are included in a revocation list.

Example 16b includes the at least one medium of example 15b, wherein the anonymously authenticating the member computing node to the verifier computing node comprises the member computing node performing a zero-knowledge membership proof with the verifier computing node, the zero-knowledge membership proof being based on the base value and the pseudonym.

Example 17b includes at least one storage medium having instructions stored thereon for causing a verifier computing node to: establish a communication channel with a member computing node, the member computing node and the verifier computing node each coupled to a respective charging coil; communicate a group of devices approved for charging between the verifier and member computing nodes; authenticate the member computing node to the verifier computing node; in response to authenticating the member computing node to the verifier computing node, inductively charge the member computing node based on a magnetic field produced by the verifier computing node.

Example 18b includes the at least one medium of example 17b comprising instructions to anonymously authenticate the member computing node to the verifier computing node, wherein the verifier node does not receive an identifier that uniquely identifies the member computing node to the verifier computing node.

Example 19b includes the at least one medium of example 17b, wherein the authenticating the member computing node to the verifier computing node comprises the verifier computing node receiving a signed message that is signed with a private key known to the member computing node but not the verifier computing node.

Example 20b includes the at least one medium of example 17b comprising instructions to authenticate the member computing node to the verifier computing node based on at least one of a list of corrupted private keys and a list of signatures.

Example 21b includes the at least one medium of example 17b, wherein the anonymously authenticating the member computing node to the verifier computing node comprises the member computing node performing a zero-knowledge membership proof with the verifier computing node, the zero-knowledge membership proof being based on the base value and the pseudonym.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one storage medium having instructions stored thereon for causing a system to:
    cause a member computing node to:
        establish a communication channel with a verifier computing node, the member computing node and the verifier computing node each coupled to a respective charging coil;
        determine a group of devices approved for charging with the verifier computing node;
        determine the member computing node is a member of the group of devices;
        anonymously authenticate the member computing node to the verifier computing node;

in response to anonymously authenticating the member computing node to the verifier computing node, inductively charge the member computing node based on a magnetic field produced by the verifier computing node;

wherein: (a) the member computing node does not uniquely identify itself to the verifier computing node; (b) the anonymously authenticating the member computing node to the verifier computing node comprises the member computing node signing a message with a private key and communicating the signed message to the verifier computing node; and (c) the private key and a plurality of other private keys all correspond to a public key coupled to the verifier computing node.

2. The at least one medium of claim 1 comprising instructions to:
determine the member computing node is not a member of the group of devices; and
communicate with an issuer computing node to become a member of the group of devices.

3. The at least one medium of claim 2, wherein the private key is unknown to the issuer computing node before authenticating the member computing node to the verifier computing node.

4. The at least one medium of claim 1 comprising instructions to cause the member computing node to store the private key in secure out-of-band storage coupled to the member computing node.

5. The at least one medium of claim 1, wherein the anonymously authenticating the member computing node to the verifier computing node comprises the member computing node performing a zero-knowledge membership proof with the verifier computing node.

6. The at least one medium of claim 5 wherein the membership proof is unlinkable.

7. The at least one medium of claim 1, wherein the signed message is based on at least one of a list of corrupted private keys and a list of signatures.

8. The at least one medium of claim 7 comprising instructions to communicate a nonce between the verifier computing node and the member computing node;
wherein the signed message is based on the nonce.

9. The at least one medium of claim 8,
wherein the anonymously authenticating the member computing node to the verifier computing node comprises the member computing node performing a zero-knowledge membership proof with the verifier computing node;
wherein the zero-knowledge membership proof is based on the nonce.

10. The at least one medium of claim 1, comprising instructions to communicate a membership credential between the member computing node and an issuer computing node, wherein signing the message with the private key comprises signing the message based on the membership credential.

11. The at least one medium of claim 10, wherein the private key is based on the membership credential and an additional membership key.

12. The at least one medium of claim 11, wherein the private key is based on a base value and a pseudonym and the base value and the pseudonym are included in a revocation list.

13. The at least one medium of claim 12, wherein the anonymously authenticating the member computing node to the verifier computing node comprises the member computing node performing a zero-knowledge membership proof with the verifier computing node, the zero-knowledge membership proof being based on the base value and the pseudonym.

14. At least one storage medium having instructions stored thereon for causing a system to:
cause a member computing node to:
establish a communication channel with a verifier computing node, the member computing node and the verifier computing node each coupled to a respective charging coil;
determine a group of devices approved for charging with the verifier computing node;
determine the member computing node is a member of the group of devices;
anonymously authenticate the member computing node to the verifier computing node;
in response to anonymously authenticating the member computing node to the verifier computing node, inductively charge the member computing node based on a magnetic field produced by the verifier computing node;
wherein: (a) the member computing node does not uniquely identify itself to the verifier computing node, (b) the anonymously authenticating the member computing node to the verifier computing node comprises the member computing node signing a message with a private key and communicating the signed message to the verifier computing node, and (c) the signed message is based on at least one of a list of corrupted private keys and a list of signatures.

15. The at least one medium of claim 14 comprising instructions to:
determine the member computing node is not a member of the group of devices; and
communicate with an issuer computing node to become a member of the group of devices;
wherein the private key and a plurality of other private keys all correspond to a public key coupled to the verifier computing node.

16. The at least one medium of claim 15, wherein the private key is unknown to the issuer computing node before authenticating the member computing node to the verifier computing node.

17. The at least one medium of claim 14 comprising instructions to cause the member computing node to store the private key in secure out-of-band storage coupled to the member computing node;
wherein the private key and a plurality of other private keys all correspond to a public key coupled to the verifier computing node.

18. The at least one medium of claim 14, wherein the anonymously authenticating the member computing node to the verifier computing node comprises the member computing node performing a zero-knowledge membership proof with the verifier computing node.

19. The at least one medium of claim 18 wherein the membership proof is unlinkable.

20. The at least one medium of claim 14 comprising instructions to communicate a nonce between the verifier computing node and the member computing node; wherein the signed message is based on the nonce.

21. The at least one medium of claim 20,
wherein the anonymously authenticating the member computing node to the verifier computing node comprises the member computing node performing a zero-knowledge membership proof with the verifier computing node;

wherein the zero-knowledge membership proof is based on the nonce.

22. The at least one medium of claim 14, comprising instructions to communicate a membership credential between the member computing node and an issuer computing node, wherein signing the message with the private key comprises signing the message based on the membership credential.

23. The at least one medium of claim 22, wherein the private key is based on the membership credential and an additional membership key.

24. The at least one medium of claim 23, wherein the private key is based on a base value and a pseudonym and the base value and the pseudonym are included in a revocation list.

25. The at least one medium of claim 24, wherein the anonymously authenticating the member computing node to the verifier computing node comprises the member computing node performing a zero-knowledge membership proof with the verifier computing node, the zero-knowledge membership proof being based on the base value and the pseudonym.

* * * * *